United States Patent [19]

Peacey et al.

[11] Patent Number: 4,800,003

[45] Date of Patent: Jan. 24, 1989

[54] PRODUCTION OF MAGNESIUM METAL FROM MAGNESIUM CONTAINING MATERIALS

[75] Inventors: John G. Peacey, Lancaster; G. Bryn Harris, Kirkland, both of Canada

[73] Assignee: Noranda Inc., Toronto, Canada

[21] Appl. No.: 102,377

[22] Filed: Sep. 29, 1987

[30] Foreign Application Priority Data

Nov. 21, 1986 [CA] Canada .................................. 523608

[51] Int. Cl.⁴ .............................................. C15R 3/04
[52] U.S. Cl. ..................................... 204/70; 423/163; 423/486; 423/415 R; 423/415 A; 423/351; 75/67 A; 75/67 R
[58] Field of Search ............................. 204/70, 60–61; 423/163, 486, 415 R, 415 A, 351; 75/67 A, 67 R

[56] References Cited

U.S. PATENT DOCUMENTS 2,165,284  7/1939  Madoasay ............................. 204/70
2,355,367  8/1944  Cooper .................................. 204/70

Primary Examiner—R. L. Andrews
Attorney, Agent, or Firm—Jacobson, Cohn & Price Fleit

[57] ABSTRACT

A process for the production of Mg metal from impure Mg-containing materials is disclosed. The process comprises the steps of reacting a slurry of impure Mg-containing material with a hot HCl-containing gas stream to produce an impure $MgCl_2$ slurry, purifying the $MgCl_2$ slurry to form a substantially pure $MgCl_2$ solution, drying the substantially pure $MgCl_2$ solution to produce a $MgCl_2$ powder containing up to about 5% each of MgO and $H_2O$, dehydration melting of the $MgCl_2$ powder to produce molten anhydrous $MgCl_2$, performing electrolysis of the molten anhydrous $MgCl_2$ to produce Mg metal and $Cl_2$, and recycling all of $Cl_2$ produced during electrolysis to the above dehydration melting step for converting MgO and $H_2O$ present in the $MgCl_2$ powder into $MgCl_2$ and HCl and for producing the hot HCl-containing gas stream. Dehydration melting is preferably done by feeding the $MgCl_2$ powder into the feed end of a rotary kiln, and reacting $Cl_2$ produced during electrolysis with carbonaceous fuel and air in a burner located at the discharge end of the rotary kiln to produce a hot gas mixture containing HCl, CO, $Co_2$, $N_2$ and sufficient unreacted $Cl_2$ to convert essentially all the MgO and $H_2O$ present in the $MgCl_2$ powder into $MgCl_2$ and HCl.

4 Claims, 2 Drawing Sheets

PRODUCTION OF MAGNESIUM METAL FROM MAGNESIUM CONTAINING MATERIALS

This invention relates to the production of Mg metal from Mg-containing materials, such as magnesite, serpentine, olivine and asbestos tailings.

Mg metal is currently produced commercially either by: (a) electrolysis of anhydrous $MgCl_2$ (Norsk Hydro and I. G. (Farben processes) or hydrated $MgCl_2.2H_2O$ (Dow process); or (b) thermal reduction of calcined dolomite by ferro-silicon (Magnatherm and Pidgeon processes). The Mg-containing feedstocks for the current electrolytic processes are either: $Mg(OH)_2$ or calcined MgO produced from seawater; or $MgCl_2$- containing natural or lake brines. An excellent recent review of current magnesium metal production processes is given by N. Jarrett in Metallurgical Treatises published by AIME, November 1981.

A recent patent (Canadian Pat. No. 1,128,288) describes the preparation of anhydrous molten magnesium chloride from lump magnesite by reaction with chlorine and carbon monoxide, but this process has not yet been commercialized. This process is however limited to the use of high-purity magnesite ores because direct chlorination does not remove important impurities, in particular Ni and Ca. Based on available information, it is believed that nobody has previously developed a process to produce pure Mg metal from impure Mg-containing materials.

Applicant has devised a process for the production of Mg metal from impure Mg-containing materials and believes that such process has considerable economic advantages over current processes using seawater MgO or brines due to its process simplicity, its use of low cost abundant Mg-containing material, and also the elimination of byproduct $Cl_2$ production.

The process in accordance with the present invention comprises the steps of reacting a slurry of impure high Mg-containing material with a hot HCl-containing gas stream to produce an impure $MgCl_2$ slurry, purifying the $MgCl_2$ slurry to form a substantially pure $MgCl_2$ solution, drying in a spray or fluidized bed drier such substantially pure $MgCl_2$ solution to produce a $MgCl_2$ powder containing up to about 5% each of MgO and $H_2O$, dehydration melting of the $MgCl_2$ powder to produce molten anhydrous $MgCl_2$, performing eletrolysis of the molten anhydrous $MgCl_2$ to produce Mg metal and $Cl_2$, and recycling all the $Cl_2$ produced during electrolysis to the dehydration smelting stage for converting MgO and $H_2O$ present in the $MgCl_2$ powder into $MgCl_2$ and HCl and for producing the hot HCl-containing gas stream.

The dehydration melting step is preferably performed by feeding $MgCl_2$ powder into the feed end of a rotary kiln, and reacting $Cl_2$ produced during electrolysis with carbonaceous fuel and air in a burner located at the discharge end of the rotary kiln to produce a hot gas mixture containing HCl, CO, $CO_2$, $N_2$ and sufficient unreacted $Cl_2$ to convert essentially all the MgO and $H_2O$ present in the $MgCl_2$ powder into $MgCl_2$ and HCl.

The hot gas mixture which leaves the rotary kiln is afterburned with natural gas or other hydrogen-containing gas to convert any unreacted $Cl_2$ to HCl.

The hot HCl-containing gas stream is then used to provide part of the necessary heat for the drier operation.

Additional carbonaceous material may also be added to the rotary kiln to ensure enough carbon reductant for complete conversion of MgO and $H_2O$ to $MgCl_2$ and HCl.

BRIEF DESCRIPTION OF THE DRAWINGS

The invention will now be disclosed, by way of example with reference to the accompanying drawings in which.

DETAILED DESCRIPTION OF THE DRAWINGS

Figure 1:
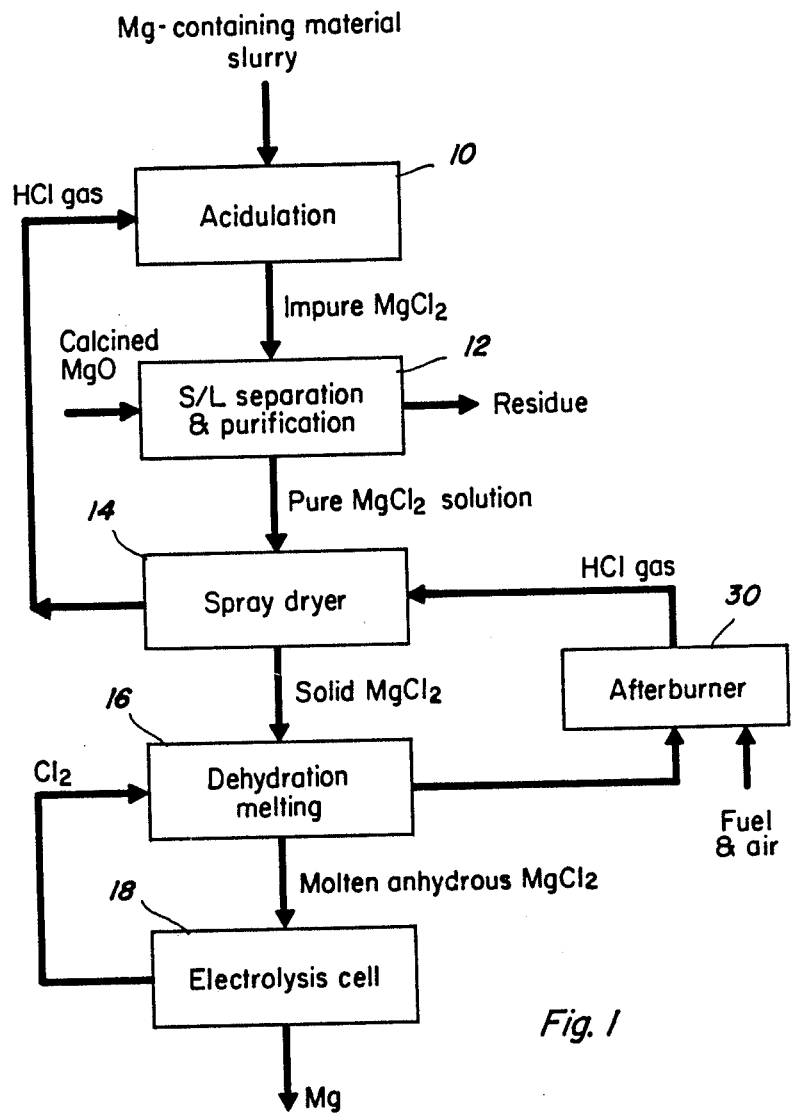
FIG. 1 is a flowsheet of the process in accordance with the invention.

Referring to FIG. 1, a slurry of Mg-containing material is contacted with a hot HCl-containing gas stream in an acidulator 10 to produce an impure aqueous $MgCl_2$ slurry, containing about 400 gpL $MgCl_2$ plus undissolved residue. The HCl-containing gas stream is produced in a later stage of the process. Typically over 90% of the Mg containing material is reacted. The resulting impure $MgCl_2$-containing slurry is then fed to a suitable solid/liquid separation stage 12 and purified by the addition of calcined MgO to raise the pH to a value of about 6 so that virtually all the heavy metals (Ni, Cr, Mn) are precipitated from solution. Depending on the type or level of impurities in the Mg-containing material, additional solution purification steps may be employed, such as solvent extraction to remove boron. Such purification steps are well-known to those in the field. The acidulation process and solution purification, using pH control, are currently used commercially for the production of high-purity MgO by Andritz-Ruthner Industrieanlagen AG, Vienna.

Figure 2:
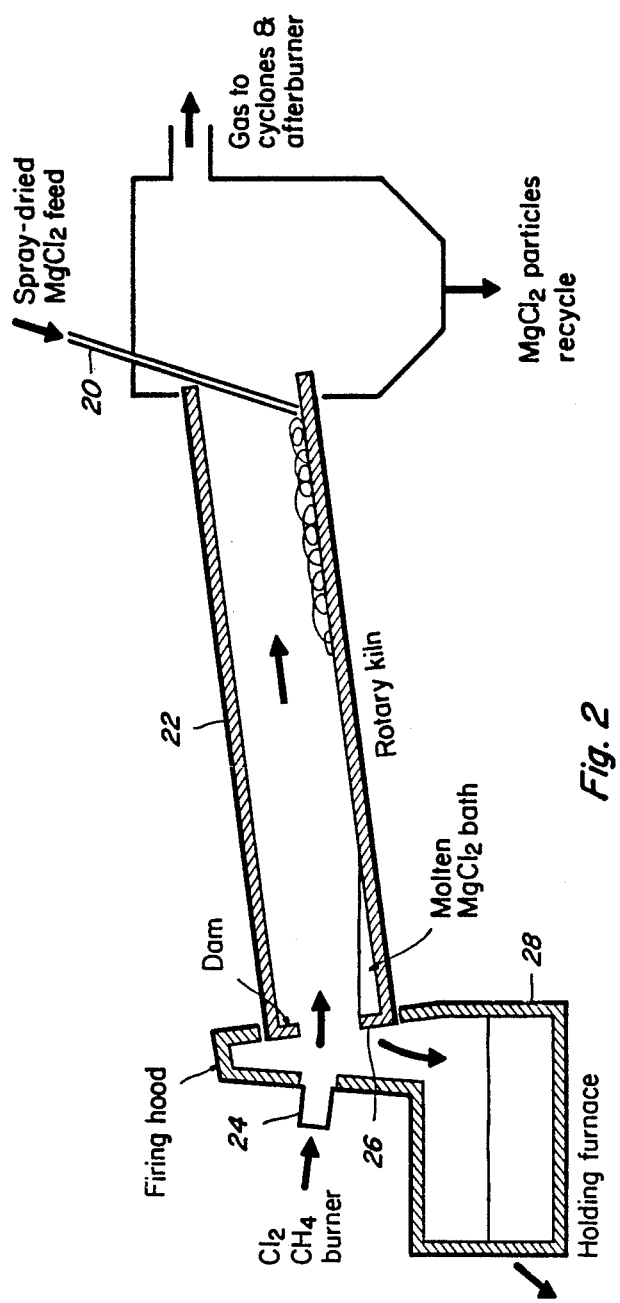
FIG. 2 is a rotary kiln used for carrying out the dehydration melting step in accordance with the present invention.

After filtration to remove the insoluble impurities and purification, the pure $MgCl_2$ solution is sprayed into a spray drier 14 to produce a solid $MgCl_2$ powder, still containing some MgO and $H_2O$ (usually less than 5% of each). Spray drying of $MgCl_2$ solutions is an established unit operation and is currently practiced. The MgO and $H_2O$ levels in the spray-dried $MgCl_2$ are too high to be fed directly to Mg electrolysis cells because they would cause excessive wear of the graphite anodes and high sludge formation. The spray-dried $MgCl_2$ is therefore converted into pure molten anhydrous $MgCl_2$, preferably containing less than 0.2% MgO and $H_2O$, in a dehydration melting stage 16 prior to being fed to an electrolysis cell 18. In addition, the $Cl_2$ produced by the electrolysis of anhydrous $MgCl_2$ is recycled to the dehydration melting stage 16 for producing the above mentioned HCl-containing gas stream and for converting MgO and $H_2O$ present in the spray-dried $Mgcl_2$ into $Mgcl_2$ and HCl. The above two reactions can be efficiently combined in a novel rotary kiln melting reaction unit, shown in FIG. 2.

Spray-dried $MgCl_2$ powder is fed into the feed-end 20 of a rotary kiln 22, while chlorine, from the electrolysis cell, is reacted with natural gas (or other carbonaceous fuel) and air or oxygen-enriched air in a burner 24 at the discharge end of the kiln to provide a hot gas mixture of HCl, CO, $CO_2$, $N_2$ and unreacted $Cl_2$. The hot gases from the burner react with the incoming $MgCl_2$ feed moving down the kiln to produce molten anhydrous $MgCl_2$ by the following general reactions:

Burner Reaction $$xCH_y + \frac{x}{2} O_2 + zCl_2 \longrightarrow xyHCl + \left(z - \frac{xy}{2}\right) Cl_2 + \frac{x}{2} CO$$

Kiln Reactions $$MgO(s) + CO + Cl_2 \longrightarrow MgCl_2 + CO_2$$

$$H_2O + CO + Cl_2 \longrightarrow 2HCl + CO_2$$

$$MgCl_2 (s) \longrightarrow MgCl_2 (l)$$

The exact stoichiometry of the above reactions is dependent on the amounts of MgO and $H_2O$ in the spray-dried $MgCl_2$ solid feed and the $C:H_2$ ratio of the carbonaceous fuel used for burning. After burning of part of the recycled $Cl_2$ with carbonaceous fuel and air/oxygen, sufficient unreacted $Cl_2$ and CO must be available to completely convert MgO and $H_2O$ in the feed to $MgCl_2$ and HCl. If necessary, suitable carbonaceous materials can be added to the kiln feed to ensure sufficient reductant is available. Thus, the solid $MgCl_2$ feed, containing MgO and $H_2O$, is contacted with the countercurrent flow of hot gases in the kiln to eventually produce molten anhydrous $MgCl_2$ at about 800° C., which continuously overflows a refractory dam 26 at the discharge end of the kiln into a heated holding furnace 28, from which molten anhydrous $MgCl_2$ is periodically tapped into ladles for transport to the electrolytic cells. The gases leave the kiln at a temperature of about 400° C. The gases are cleaned in a suitable gas cleaning device, for example cyclones, to remove most of the entrained $MgCl_2$ particles for recycle to the kiln. To reduce particulate carryover from the kiln, the spray-dried $MgCl_2$ powder can be pelletized or briquetted. The kiln gases are then afterburned with fuel and air in a chamber 30 as shown in FIG. 1 to ensure no undesirable chlorinated hydrocarbons are present, and the hot HCl-containing gases used either directly or indirectly (using recuperative stove) to provide part of the necessary heat for the spray-drier operation. The hot HCl-containing gases are then fed to the acidulator stage 10.

Other methods of producing anhydrous $MgCl_2$ can also be used, such as the 2-stage, electrically-heated melting/reaction process disclosed in U. S. Pat. No. 3,593,574 or a shaft furnace as described in Canadian Pat. No. 886,212.

The molten anhydrous $MgCl_2$ is transported to the electrolytic cell 18 where Mg metal is produced and from which $Cl_2$ gas is recycled to the rotary kiln burner. Any suitable Mg electrolysis cell design can be used, such as I. G. Farben, Alcan or others.

The combination of the various process steps: i.e. reacting impure Mg-containing materials with hot HCl gas, purification of MgCl solution, drying of pure $MgCl_2$ solution, conversion to molten anhydrous $MgCl_2$, electrolysis of molten $MgCl_2$ and conversion of $Cl_2$ to HCl into an integrated, efficient flowsheet is considered novel and allows the economic production of high-purity Mg metal from impure Mg-containing materials, which are the most readily-available source of low-cost Mg-containing feed. The process is energy-efficient due to (1) eliminating the need to calcine the Mg-containing feed, (2) the direct recovery of heat from the $Cl_2$ to HCl conversion, and (3) utilization of the hot HCl-containing gas to provide part of the necessary heat for the spray drier operation. The process is a small net consumer of $Cl_2$ so that Mg production is not limited by the need to sell a chlorine by-product as with $MgCl_2$-brine feeds. In addition, the $MgCl_2$ solution purification system allows the possibility of minimizing electrolyte and chlorine make-up requirements by recycling cell sludge as well as using waste HCl or other chloride wastes (e.g. $FeCl_3$) for $Cl_2$ make-up. The above process flowsheet offers lower capital and operating costs for Mg metal production than existing processes.

The use of a rotary kiln to produce molten anhydrous $MgCl_2$ is also considered novel and has the following advantages:

(a) it combines $Cl_2$ conversion to HCl and dehydration melting of spray-dried $MgCl_2$ solids in a single step, (b) the heat of $Cl_2$ conversion is efficiently utilized to minimize the process fuel requirements, (c) a rotary kiln is a high productivity unit for gas-solid contacting and is capable of providing a molten product.

Although the invention has been disclosed with reference to a preferred embodiment, it is to be understood that it is not limited to such embodiment and that other alternatives are also envisaged within the scope of the following claims.

We claim:

1. A process for the production of Mg metal from impure Mg-containing materials comprising the steps of:

(a) reacting a slurry of impure Mg-containing material with a hot HCl-containing gas stream to produce an impure $MgCl_2$ slurry;

(b) purifying said $MgCl_2$ slurry to form a substantially pure $MgCl_2$ solution ;

(c) drying said substantially pure $MgCl_2$ solution to produce a $MgCl_2$ powder containing up to about 5% each of MgO and $H_2O$;

(d) dehydration melting of said $MgCl_2$ powder to produce molten anhydrous $MgCl_2$;

(e) performing electrolysis of said molten anhydrous $MgCl_2$ to produce Mg metal and $Cl_2$; and (f) recycling all the $Cl_2$ produced during electrolysis to said dehydration melting step for converting MgO and $H_2O$ present in said $MgCl_2$ powder into $MgCl_2$ and HCl and for producing said hot HCl-containing gas stream.

2. A process as defined in claim 1, wherein dehydration melting comprises the steps of:

(a) feeding said $MgCl_2$ powder into the feed end of a rotary kiln; and (b) reacting $Cl_2$ produced during electrolysis with carbonaceous fuel and air in a burner located at the discharge end of said rotary kiln to produce a hot gas mixture containing HCl, CO, $CO_2$, $N_2$ and sufficient unreacted $Cl_2$ to convert essentially all the MgO and $H_2O$ contained in the feed into $MgCl_2$ and HCl.

3. A process as defined in claim 2, further comprising the step of afterburning the hot gas mixture which leaves the rotary kiln with natural gas or other hydrogen-containing gas to convert any unreacted $Cl_2$ to HCl.

4. A process as defined in claim 3, wherein said hot HCl-containing gas stream is used to provide part of the necessary heat for the drier operation.

* * * * *